(12) United States Patent
Mesters et al.

(10) Patent No.: US 7,335,253 B2
(45) Date of Patent: Feb. 26, 2008

(54) PROCESS FOR PREPARING A SULPHUR CEMENT PRODUCT

(75) Inventors: Carolus Matthias Anna Maria Mesters, Amsterdam (NL); Marinus Johannes Reynhout, Amsterdam (NL); Guy Lode Magda Maria Verbist, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 11/392,066

(22) Filed: Mar. 29, 2006

(65) Prior Publication Data

US 2007/0006780 A1 Jan. 11, 2007

(30) Foreign Application Priority Data

Mar. 31, 2005 (EP) .................. 05075745

(51) Int. Cl.
  *C04B 28/36* (2006.01)
  *C04B 7/36* (2006.01)
  *C01B 17/00* (2006.01)
  *C01B 17/04* (2006.01)

(52) U.S. Cl. ............. 106/768; 106/736; 106/739; 106/752; 106/758; 423/573.1; 423/576.2; 423/576.8

(58) Field of Classification Search ............. 106/736, 106/739, 752, 758, 768; 423/573.1, 576.2, 423/576.8
See application file for complete search history.

(56) References Cited

U.S. PATENT DOCUMENTS

| | | | | |
|---|---|---|---|---|
| 2,135,747 A * | 11/1938 | Duecker | ............... | 524/392 |
| 4,058,500 A * | 11/1977 | Vroom | ............... | 523/219 |
| 4,293,463 A * | 10/1981 | Vroom | ............... | 524/493 |
| 4,311,683 A | 1/1982 | Hass et al. | ............... | 423/573 |
| 4,311,826 A * | 1/1982 | McBee et al. | ............... | 528/389 |
| 4,391,969 A * | 7/1983 | McBee et al. | ............... | 528/389 |
| 4,487,753 A | 12/1984 | Massie et al. | ............... | 423/573 R |
| 4,496,659 A * | 1/1985 | Nimer et al. | ............... | 501/140 |
| 4,632,818 A | 12/1986 | Chen et al. | ............... | 423/574 R |
| 4,640,908 A | 2/1987 | Dupin | ............... | 502/243 |
| 4,662,945 A * | 5/1987 | Lawall | ............... | 106/752 |
| 4,715,811 A * | 12/1987 | Lawall | ............... | 432/58 |
| 4,886,649 A | 12/1989 | Ismagilov et al. | ............... | 423/230 |
| 6,083,473 A | 7/2000 | Esquivel et al. | ............... | 423/576.8 |
| 6,207,127 B1 | 3/2001 | Geus et al. | ............... | 423/573.1 |
| 6,235,259 B1 | 5/2001 | Ledoux et al. | ............... | 423/573.1 |
| 6,403,051 B1 | 6/2002 | Keller | ............... | 423/573.1 |
| 2005/0100504 A1* | 5/2005 | Geus et al. | ............... | 423/573.1 |

FOREIGN PATENT DOCUMENTS

| | | |
|---|---|---|
| EP | 242920 | 10/1987 |
| EP | 409353 | 1/1991 |
| JP | 60-46960 | 3/1985 |
| WO | 99/37389 | 7/1999 |
| WO | WO2005030638 | 4/2005 |

OTHER PUBLICATIONS

Derwent-Acc-No: 2001-030621, abstract of Russian Patent Specification No. RU 2154602 C1 (Aug. 2000).*
European Patent Office Communication dated Oct. 21, 2005 including European Search Report dated Sep. 20, 2005 for application No. EP 05075745.9.
'The Viscosity of Sulfur', pp. 639-648 by R. F. Bacon and R. Fanelli, J. Am. Chem. Soc., vol. 65 (1943) (no month).
'Viscosity-Chain Length Relationship in Molten Sulfur Systems', pp. 239-241 by Touro et al., J. Phys. Chem., vol. 70, No. 1 (1966) (no month).

* cited by examiner

*Primary Examiner*—Anthony J. Green

(57) ABSTRACT

The invention provides a process for preparing a sulphur cement product comprising the following steps:
  (a) selectively oxidising hydrogen sulphide to elemental sulphur by contacting, in a reaction zone, a hydrogen sulphide containing feed gas and a molecular-oxygen containing gas with a particulate oxidation catalyst under selective oxidation conditions;
  (b) discharging a stream comprising liquid and/or solid elemental sulphur and particulate oxidation catalyst from the reaction zone;
  (c) admixing the stream comprising elemental sulphur and particulate oxidation catalyst with at least any one of elemental sulphur, a sulphur cement filler, a sulphur cement modifier, or aggregate at a temperature at which sulphur is molten;
  (d) solidifying the mixture obtained in step (c) by cooling it to a temperature below the melting temperature of sulphur to obtain the sulphur cement product.

The invention further provides the use of a stream comprising elemental sulphur and particulate oxidation catalyst for preparing a sulphur cement product, which stream is obtained in selective oxidation step (a) of such process.

20 Claims, No Drawings

PROCESS FOR PREPARING A SULPHUR CEMENT PRODUCT

CROSS-REFERENCE TO RELATED APPLICATIONS

This application claims priority from European Patent Application No. 05075745.9, filed on Mar. 31, 2005, which is incorporated herein by reference. This application is related to U.S. application Ser. No. 10/954,043 filed on Sep. 29, 2004.

FIELD OF THE INVENTION

The present invention provides a process for preparing a sulphur cement product and to the use of a stream comprising elemental sulphur and particulate oxidation catalyst for preparing a sulphur cement product, which stream is obtained in selective oxidation step (a) of such process.

BACKGROUND OF THE INVENTION

Elemental sulphur is a by-product of oil and gas refining processes. A known application of the elemental sulphur obtained as a by-product of oil and gas refining is its use as a binder in sulphur cement or in other sulphur cement products, for example sulphur cement-aggregate composites like sulphur mortar, sulphur concrete or sulphur-extended asphalt.

In refineries, sulphur compounds in liquid hydrocarbonaceous streams are typically converted by reaction with hydrogen into hydrogen sulphide. Thus, a gaseous stream comprising hydrogen sulphide and hydrogen is obtained. The hydrogen sulphide separated from this hydrogen sulphide and hydrogen mixture or the hydrogen sulphide separated from natural gas is typically converted into elemental sulphur. A well-known example of such process is the so-called Claus process.

Conversion of hydrogen sulphide into elemental sulphur using the Claus process has certain disadvantages. The oxidation step in the Claus process is not selective for hydrogen sulphide, therefore separation of the hydrogen sulphide from the remainder of the gas stream is necessary. In view of thermodynamic limitations, no complete conversion of hydrogen sulphide in a single process stage can be obtained.

An alternative process for the conversion of hydrogen sulphide into elemental sulphur is the selective oxidation of hydrogen sulphide in hydrocarbonaceous gas streams. Such selective oxidation processes are disclosed in for example U.S. Pat. Nos. 4,886,649, 4,311,683 and 6,207,127. Compared to the Claus process, selective oxidation has several advantages. An advantage is that a high conversion of hydrogen sulphide can be obtained in a single process stage. Another advantage is that the oxidation is selective for hydrogen sulphide, thus avoiding the need for separation of the hydrogen sulphide from the other gas components. A disadvantage is, however, that catalyst deactivation due to clogging of the catalyst with the sulphur formed may occur. In order to avoid clogging, the prior art selective oxidation processes typically use a low concentration of hydrogen sulphide in the feed gas, typically at most 1 wt %.

SUMMARY OF THE INVENTION

It has now been found that a stream comprising elemental sulphur and oxidation catalyst particles obtained by a process for selective oxidation of hydrogen sulphide to elemental sulphur is particularly suitable to be used in sulphur cement products, for example sulphur cement, sulphur cement-aggregate composites or sulphur cement premix compositions. The oxidation catalyst particles serve as filler and/or stabiliser material in the resulting sulphur cement product.

Accordingly, the present invention provides a process for preparing a sulphur cement product comprising the following steps:
(a) selectively oxidising hydrogen sulphide to elemental sulphur by contacting, in a reaction zone, a hydrogen sulphide containing feed gas and a molecular-oxygen containing gas with a particulate oxidation catalyst under selective oxidation conditions;
(b) discharging a stream comprising liquid and/or solid elemental sulphur and particulate oxidation catalyst from the reaction zone;
(c) admixing the stream comprising elemental sulphur and particulate oxidation catalyst with at least any one of elemental sulphur, a sulphur cement filler, a sulphur cement modifier, or aggregate at a temperature at which sulphur is molten;
(d) solidifying the mixture obtained in step (c) by cooling it to a temperature below the melting temperature of sulphur to obtain the sulphur cement product.

The process according to the invention has several advantages. One advantage is that the elemental sulphur is formed by a selective oxidation process, i.e. without substantial oxidation of other compounds. This means that there is no need to separate the hydrogen sulphide from the remainder of the feed gas prior to the oxidation step.

Since both the oxidation catalyst particles and the elemental sulphur formed are used for the sulphur cement product, separation of sulphur from catalyst particles is not needed. As a consequence very small catalyst particles may be used.

Another advantage of not separating the sulphur from the catalyst particles is that clogging of the catalyst particles with sulphur is allowed to a certain extent. As a consequence there is no need to dilute the hydrogen sulphide in the feed gas to such extent as is typically done in prior art selective oxidation processes.

The present invention further provides the use of a stream comprising elemental sulphur and particulate oxidation catalyst that is obtained in a selective oxidation process as defined in step (a) of the process as hereinabove defined to prepare a sulphur cement product.

DETAILED DESCRIPTION OF THE INVENTION

In the process according to the invention, a stream comprising liquid and/or solid elemental sulphur and particulate oxidation catalyst obtained in a process step for selectively oxidising the hydrogen sulphide in a feed gas is used for the preparation of a sulphur cement product.

In selective oxidation step (a) of the process according to the invention, hydrogen sulphide is selectively oxidised to elemental sulphur according to the reaction $$2H_2S + O_2 \rightarrow 2H_2O + 2/n\, S_n \qquad (1)$$

by contacting a hydrogen sulphide containing feed gas and a molecular-oxygen containing gas with a particulate oxidation catalyst under selective oxidation conditions. Reference herein to selective oxidation of hydrogen sulphide is to an oxidation process wherein compounds other than hydrogen sulphide, for example hydrocarbons or hydrogen, are not or hardly oxidised.

In step (a) of the process according to the invention, the hydrogen sulphide in the feed gas is converted into elemental sulphur. The sulphur formed may be in its solid, liquid or gaseous phase. Preferably, the process conditions are such that the elemental sulphur formed is liquid. More preferably, the elemental sulphur formed is liquid without substantial formation of polymerised sulphur. An important advantage of forming liquid sulphur that is substantially non-polymerised is that deposition of solid or polymerised sulphur on reactor elements, conduits or catalysts particles is prevented. In order to form liquid sulphur that is substantially non-polymerised, the temperature at which the feed gas and the molecular-oxygen containing gas are contacted with the catalyst in step (a) is preferably in the range of from 110 to 180° C., more preferably of from 120 to 160° C., even more preferably of from 125 to 150° C.

The selective oxidation reaction is an exothermic reaction. In order to be able to keep the reaction temperature in the range wherein liquid, substantially non-polymerised sulphur is formed, it might be necessary to remove heat released during the exothermic reaction from the reaction zone, for example by indirect heat exchange with a coolant.

Preferably, the temperature in step (a) is maintained within the temperature range wherein the sulphur formed is liquid and substantially non-polymerised by contacting the hydrogen sulphide containing feed gas and the molecular-oxygen containing gas with the oxidation catalyst in the presence of an inert liquid medium. The inert liquid medium may be any liquid medium that is not substantially consumed under the process conditions and that does not substantially degrade the oxidation catalyst. At least part of the inert liquid medium should be in liquid form at the selective oxidation conditions in order to be able to control the temperature in step (a). The inert liquid medium may be a reaction product of the selective oxidation reaction (1), i.e. water or liquid sulphur. The inert liquid medium may also be another liquid compound that is not substantially consumed under the process conditions. Examples of such liquids are paraffins like n-pentane, n-hexane, n-heptane, n-octane and mixtures thereof, refinery hydrocarbon streams such as naphtha or kerosene, crude oil, toluene, alkanol amines and sulfinol. The inert liquid medium is preferably elemental sulphur. Liquid sulphur is a particular suitable inert liquid medium, because it avoids the need for separation of sulphur from the inert liquid medium and the inevitable separation losses.

The amount of inert liquid medium in the reaction zone is preferably such that the ratio of gas-to-liquid in the reaction zone is in the range of from 10 to 10,000 normal liters gas per kilogram liquid (NL/kg), more preferably of from 20 to 2,000 NL/kg. Reference herein to normal liters is to liters of gas at conditions of Standard Temperature and Pressure, i.e. 0° C. and 1 atmosphere. It will be appreciated that the exact gas-to-liquid ratio mainly depends on the amount of hydrogen sulphide that is to be oxidized, since the inert liquid has the function to absorb the reaction heat in order to keep the reaction temperature of that zone below the temperature at which a significant viscosity increase due to sulphur polymerisation takes place, i.e. below 180° C.

If the feed gas and the molecular-oxygen containing gas are contacted with the catalyst in the presence of liquid inert medium, the selective oxidation reaction takes place in a three-phase system. The oxidation catalyst may then be in any arrangement that is suitable for a three-phase reaction system, such as a fixed bed of catalyst particles or a slurry in a slurry bubble column, preferably a slurry in a slurry bubble column.

Reference herein to the reaction zone in step (a) is to a zone comprising at least one catalytic zone comprising oxidation catalyst and optionally separators, for example for separating gaseous effluent from non-gaseous effluent, for separating liquid inert medium from non-gaseous effluent or for separating catalyst particles from non-gaseous effluent. The reaction zone may comprise more than one catalytic zones.

The particulate oxidation catalyst may be any oxidation catalyst suitable for the selective oxidation of hydrogen sulphide. Such catalysts are known in the art and are generally in the form of a refractory oxide material on which the catalytically active material is supported. The catalytically active material typically comprises an oxide and/or a sulphide compound of one or more metals. The metal may for example be vanadium, chromium, manganese, iron, cobalt, molybdenum or combinations thereof. Examples of prior art catalysts for the selective oxidation of hydrogen sulphide are iron oxide-chromium oxide on silica, iron oxide-phosphorus oxide on silica, iron oxide-sodium oxide on silica (EP 409 353 A1) magnesium chromite on alumina, vanadium pentoxide on alumina (U.S. Pat. No. 4,886,649) and silicon carbide supporting an active phase comprising nickel in the oxysulfide form (U.S. Pat. No. 6,235,259). Preferably, the catalytically active material is an oxide and/or sulphide compound of iron or an iron comprising mixed metal oxide and/or sulphide compound, more preferably the catalytically active material comprises a hydrated iron oxide compound. Iron oxide containing mineral material such as for the material known as 'red mud' may be used as oxidation catalyst in the process according to the invention.

Reference herein to an oxide compound of one or more metals is to a compound of the approximate general formula $MS_{x-1}O_y$, wherein M is one or more metals, and x and y have, independently, a numeric value of at least 1. Reference herein to a sulphide compound of one or more metals is to a compound of the approximate general formula $MS_xO_{y-1}$. When contacted with hydrogen sulphide, the metal oxide compound will be converted to a metal sulphide compound and water is formed. When the thus-formed metal sulphide compound is then contacted with oxygen, it is converted into the metal oxide compound and elemental sulphur is formed. These two subsequent reactions are symbolically represented by the following equations:

$$MS_{x-1}O_y + H_2S \rightarrow MS_xO_{y-1} + H_2O \qquad (1a)$$

$$MS_xO_{y-1} + \tfrac{1}{2}O_2 \rightarrow MS_{x-1}O_y + S \qquad (1b)$$

The overall reaction is the selective oxidation reaction according to equation (1). It will be appreciated that the oxidation catalyst thus comprises a metal compound containing oxygen and sulphur in proportion varying during the catalytic process. The compound having the highest proportion of oxygen is represented as $MS_{x-1}O_y$ in equations (1a) and (1b) and referred to as oxide. The compound having the highest proportion of sulphur is represented as $MS_xO_{y-1}$ and referred to as sulphide.

In some embodiments of step (a) of the process according to the invention, the reaction zone comprises one or more catalytic zones wherein both reactions (1a) and (1b) take place in each catalytic zone. In these embodiments, both hydrogen sulphide and molecular oxygen are supplied to each catalytic zone. In each catalytic zone, the catalytically-active compounds of the oxidation catalyst, i.e. the oxide or sulphide compounds of a metal, will alternately be in its oxide ($MS_{x-1}O_y$) and sulphide ($MS_xO_{y-1}$) form.

In alternative embodiments of step (a) of the process of the invention, reaction (1a) takes place in one catalytic zone and reaction (1b) takes place in a different catalytic zone. It will be appreciated that in these alternative embodiments, the oxidation catalyst can be considered as a regenerable adsorbent. The hydrogen sulphide containing feed gas is then supplied to the catalytic zone where reaction (1a) takes place and the molecular-oxygen containing gas is then supplied to the catalytic zone where reaction (1b) takes place. During the process, the oxidation catalyst in the zone wherein reaction (1a) takes place will be converted from its oxide form ($MS_{x-1}O_y$) into its sulphide form ($MS_xO_{y-1}$) and the oxidation catalyst in the zone wherein reaction (1b) takes place will be converted from its sulphide form into its oxide form. In the case of a very high content of hydrogen sulphide in the feed gas, it may be advantageous to perform step (a) in such way that reactions (1a) and (1b) are carried out in separate catalytic zones. In this way, air can be used as molecular-oxygen containing gas, without diluting the treated feed gas with nitrogen.

The reaction zone of step (a) of the process according to the invention may comprise two or more catalytic zones of oxidation catalyst in series. Both reactions (1a) and (1b) then take place in each catalytic zone and hydrogen sulphide and oxygen are supplied to and contacted with the oxidation catalyst of each catalytic zone. The use of several catalytic zones in series is advantageous in the case of a feed gas having a high content of hydrogen sulphide. In that case, several catalytic zones in series can provide for the possibilities of interstage cooling, interstage water separation, staged supply of feed gas or of molecular-oxygen containing gas or a combination of two or more thereof.

If the selective oxidation in step (a) is carried out in the presence of inert liquid medium, the inert liquid medium is present in each catalytic zone and thus in each zone, the reaction (according to equations (1a) and/or (1b)) takes place in the presence of inert liquid medium.

The hydrogen sulphide containing feed gas may be any hydrogen sulphide gas containing stream, for example hydrogen sulphide containing hydrocarbonaceous gas streams such as natural gas, associated gas, ethane and propane; gases derived from tar sand and shale oils; coal derived synthesis gas; gases such as hydrogen, nitrogen, carbon monoxide, carbon dioxide and mixtures thereof; steam; inert gases such as helium and argon; product gas streams from other hydrogen sulphide removal processes, for example regeneration gas from an amino absorber; or the gaseous effluent of a hydrodesulphurisation process.

The feed gas may have a relatively high content of hydrogen sulphide, i.e. up to 50 volume %. Preferably, the hydrogen sulphide containing feed gas comprises hydrogen sulphide in a concentration in the range of from 0.5 to 50 volume %, more preferably of from 1 to 25 volume %.

The hydrogen sulphide containing feed gas is preferably supplied to one or more of the catalytic zones in the reaction zone at a gas hourly velocity in the range of from 100 to 10,000 Nl/kg/h (normal liters of gas per kilogram of catalyst in that zone per hour), more preferably of from 200 to 5,000 Nl/kg/h.

The overall molar ratio of molecules oxygen in the molecular-oxygen containing gas and hydrogen sulphide in the feed gas that are supplied to the reaction zone is preferably in the range of from 0.3 to 3.0, more preferably of from 0.5 to 2.0. In order to achieve deep desulphurisation, i.e. to obtain a hydrogen sulphide depleted gas having less than 1 ppmv of hydrogen sulphide, the overall molar ratio is suitably at least slightly above the stoichiometric ratio of 0.5. Thus, an oxygen-to-hydrogen sulphide molar ratio in the range of from 0.6 to 1.5 is particularly preferred.

The oxygen concentration in the molecular-oxygen containing gas is not critical. It will be appreciated that the preferred oxygen concentration depends primarily on the concentration of the hydrogen sulphide in the feed gas. In case of a very high content of hydrogen sulphide in the feed gas it is preferred, in order to avoid a high concentration of nitrogen or other gases in the hydrogen sulphide depleted gas, to either use substantially pure oxygen or to use air in an embodiment of process step (a) wherein reactions (1a) and (1b) are performed in separate catalytic zones. Examples of suitable molecular-oxygen containing gases are oxygen, air or oxygen-enriched air.

Selective oxidation step (a) is preferably operated at elevated pressure, more preferably at a pressure in the range of from 2 to 200 bar (absolute), even more preferably of from 10 to 150 bar (absolute). Most preferably, the operating pressure is in the range of from 60 to 120 bar (absolute).

If step (a) is carried out in a slurry bubble column in the presence of inert liquid medium, a gaseous stream of hydrogen sulphide depleted gas and a slurry of solid oxidation catalyst particles in a liquid mixture of inert medium and sulphur are formed in the catalytic zone, i.e. in the slurry bubble column, and discharged from it. If the inert liquid medium is not liquid sulphur, at least part of the inert liquid medium will typically be separated from the slurry and recycled to the catalytic zone. The remaining slurry comprising solid oxidation catalyst particles and liquid sulphur may then be discharged from the reaction zone (step (b)) as the stream comprising liquid and/or solid elemental sulphur and particulate oxidation catalyst.

In the preferred embodiment wherein liquid sulphur is used as the inert liquid medium, a slurry of catalyst particles in liquid sulphur is formed in the catalytic zone and may be discharged from the reaction zone and used for the preparation of a sulphur cement product in steps (c) and (d).

Alternatively, the slurry of catalyst particles in liquid sulphur may be separated into a slurry enriched in catalyst particles that is recycled to the catalytic zone and a slurry enriched in liquid sulphur that is discharged from the reaction zone (step (b)) as the stream comprising liquid and/or solid elemental sulphur and particulate oxidation catalyst. In particular in the case of an expensive oxidation catalyst, it is preferred that part of the catalyst particles are recycled to the catalytic zone.

The stream comprising elemental sulphur and particulate oxidation catalyst discharged from the selective oxidation reaction zone preferably comprises particulate oxidation catalyst in a concentration in the range of from 2 to 50 wt %, more preferably in the range of from 5 to 35 wt %. Preferably, this stream comprises elemental sulphur in a concentration in the range of from 50 to 98 wt %, more preferably in the range of from 65 to 95 wt %. The stream comprising elemental sulphur and particulate oxidation catalyst may comprise small amounts of other compounds, for example inert liquid medium, water or sulphur-containing compounds like mercaptans. Preferably the stream comprises up to 2 wt % of other compounds, more preferably up to 1 wt %. Most preferably the stream essentially consists of elemental sulphur and particulate oxidation catalyst.

The stream comprising elemental sulphur and particulate oxidation catalyst may be continually or batch-wise discharged from the reaction zone. In order to maintain a sufficient amount of catalyst in the reaction zone, fresh catalyst is continually or batch-wise supplied to the reaction zone.

The sulphur in the stream comprising elemental sulphur and particulate oxidation catalyst that is discharged from the selective oxidation reaction zone may be in liquid or solid form, preferably in liquid form. It will be appreciated that if the sulphur formed in step (a) is in gaseous form, it has to be condensed before being discharged from the reaction zone.

The stream comprising liquid and/or solid elemental sulphur and particulate oxidation catalyst discharged from the reaction zone in step (b) is used for the preparation of a sulphur cement product by admixing it with at least any one of elemental sulphur, a sulphur cement filler, a sulphur cement modifier, or aggregate at a temperature above the melting temperature of sulphur and then solidifying the mixture by cooling it to a temperature below the melting temperature of sulphur.

Reference herein to a sulphur cement product is to sulphur cement or to a sulphur cement containing material, i.e. to a material at least containing elemental sulphur and a filler. Examples of sulphur cement containing materials are sulphur cement premix compositions and sulphur cement-aggregate composites such as sulphur mortar, sulphur concrete or sulphur-extended asphalt.

It will be appreciated that it depends on which type of sulphur cement product is to be produced and on the composition of the stream comprising elemental sulphur and particulate oxidation catalyst which stream (sulphur, filler, modifier and/or aggregate) will be admixed with the stream comprising elemental sulphur and particulate oxidation catalyst in step (c) of the process according to the invention.

Sulphur cement is known in the art and at least comprises sulphur, usually in an amount of at least 50 wt %, and a filler. Sulphur cement may be plasticised by the addition of a sulphur cement modifier in the sulphur cement preparation process. Such modifiers are known in the art. Examples of such modifiers are aliphatic or aromatic polysulphides or compounds that form polysulphides upon reaction with sulphur. Examples of compounds that form polysulphides are olefinic compounds such as dicyclopentadiene, limonene, styrene or naphthalene. Modifiers may be added in an amount in the range of from 0.05 to 25 wt % based on the weight of sulphur, usually in the range of from 0.1 to 10 wt %.

Usual sulphur cement fillers are particulate inorganic materials with an average particle size in the range of from 0.1 μm to 0.1 mm. Examples of such sulphur cement fillers are fly ash, limestone, quartz, iron oxide, alumina, titania, graphite, gypsum, talc, mica or combinations thereof. The filler content of sulphur cement may vary widely, but is typically in the range of from 5 to 50 wt %, based on the total weight of the cement.

Reference herein to a sulphur cement premix composition is to a composition comprising a pre-reacted mixture of sulphur and a sulphur cement modifier that can suitably be used for the preparation of sulphur cement by adding sulphur and/or filler to it in the required amounts.

Reference herein to sulphur cement-aggregate composites is to a composite comprising both sulphur cement and aggregate. Examples of sulphur cement-aggregate composites are sulphur mortar, sulphur concrete and sulphur-extended asphalt. Mortar comprises fine aggregate, typically with particles having an average diameter between 0.1 and 5 mm, for example sand. Concrete comprises coarse aggregate, typically with particles having an average diameter between 5 and 40 mm, for example gravel or rock. Sulphur-extended asphalt is asphalt (typically aggregate with a binder containing filler and a residual hydrocarbon fraction), wherein part of the binder has been replaced by sulphur.

The particulate oxidation catalyst in the stream that is discharged from the selective oxidation reaction zone in step (b) may serve as a filler, a stabiliser or aggregate in the sulphur cement product obtained. If the product is a sulphur cement premix composition, the particulate oxidation catalyst will serve as filler, stabiliser or aggregate in a cement or cement-aggregate composite that is prepared with the premix composition. The particles of the particulate oxidation catalyst may therefore have any size that is suitable for this purpose. Preferably, the particles of the particulate oxidation catalyst have an average diameter in the range of from 0.1 μm to 1 mm, more preferably of from 0.2 to 100 μm, even more preferably of from 0.6 to 80 μm.

Preferably, the temperature at which the stream comprising elemental sulphur and particulate oxidation catalyst is admixed-with at least any one of elemental sulphur, a sulphur cement filler, a sulphur cement modifier or an aggregate in step (c) is in the range of from 110 to 180° C., preferably of from 125 to 150° C.

EXAMPLE

The process according to the invention will be further illustrated by means of the following non-limiting example.

Selective Oxidation Step (a)

A gas stream comprising 0.75 vol % hydrogen sulphide, 1.1 vol % molecular oxygen, 26.4 vol % helium, 10.0 vol % methane and 61.8 vol % nitrogen was fed to a slurry bubble column reactor comprising catalyst particles (particle diameter <40 micrometers) in liquid elemental sulphur. The slurry bubble column reactor was operated at a temperature of 132° C. and a pressure of 40 bar. The gas hourly velocity was 1351 normal liters per kg catalyst per hour. The catalyst was composed of $Fe_2O_3$ on $FeSiO_3$ and had a total iron oxide content of 66.3 wt % based on the total catalyst. Catalytic oxidation of hydrogen sulphide took place in the reactor resulting in conversion of 57% of the hydrogen sulphide. A slurry comprising 27 wt % catalyst particles and 73 wt % elemental sulphur was discharged from the reactor.

Sulphur Mortar Preparation

Elemental sulphur and sand were mixed with the slurry that was discharged from the reactor at a mix temperature of 150° C. until an homogeneous mixture was obtained that comprised 60 wt % sulphur, 25 wt % sand and 15 wt % oxidation catalyst particles. The mixture was then poured in a steel cylindrical mould that was pre-heated to 150° C. Pressure was applied (0.25-0.5 tons) until droplets of sulphur were visible at the bottom of the mould. The thus-formed mortar cylinder was solidified by cooling and then demoulded. The cylinders had a diameter of 30 mm and a height of 30 mm.

Sulphur Mortar Characteristics

The compressive strength and E-modulus under compression of the sulphur mortar cylinder was determined in a stress-controlled compression test using a Zwick controller TT0727 with a 300 kN load cell, a test speed of 2.4 kN/s, a pre-load of 119.64 kN and a pre-load speed of 2.4 kN/s. The compressive strength at the yield point was 49 $N/mm^2$ and the E-modulus 5,100 MPa.

What is claimed is:

1. A process for preparing a sulphur cement product, comprising the following steps:
    (a) selectively oxidising hydrogen sulphide to elemental sulphur by contacting, in a reaction zone, a hydrogen sulphide containing feed gas and a molecular-oxygen containing gas with a particulate oxidation catalyst under selective oxidation conditions;
    (b) discharging a stream comprising liquid and/or solid elemental sulphur and particulate oxidation catalyst from the reaction zone;
    (c) admixing the stream comprising elemental sulphur and particulate oxidation catalyst with at least one of elemental sulphur, a sulphur cement filler, a sulphur cement modifier, or aggregate at a temperature at which sulphur is molten;
    (d) solidifying the mixture obtained in step (c) by cooling it to a temperature below the melting temperature of sulphur to obtain the sulphur cement product.

2. A process according to claim 1, wherein the sulphur cement product is selected from the group consisting of a sulphur cement premix composition, a sulphur cement, and a sulphur cement-aggregate composite.

3. A process according to claim 1, wherein in selective oxidation step (a) the hydrogen sulphide containing feed gas and the molecular-oxygen containing gas are contacted with the catalyst at a temperature at which the elemental sulphur formed is liquid.

4. A process according to claim 1, wherein in selective oxidation step (a) the hydrogen sulphide containing feed gas and the molecular-oxygen containing gas are contacted with the catalyst in the presence of an inert liquid medium.

5. A process according to claim 1, wherein in selective oxidation step (a) the hydrogen sulphide containing feed gas and the molecular-oxygen containing gas are contacted with the catalyst in a slurry bubble column.

6. A process according to claim 1, wherein the particulate oxidation catalyst comprises an oxide and/or sulphide compound of a metal.

7. A process according to claim 1, wherein the hydrogen sulphide containing feed gas comprises hydrogen sulphide in a concentration in the range of from 0.5 to 50 volume %.

8. A process according to claim 1, wherein in selective oxidation step (a) the hydrogen sulphide containing feed gas and the molecular-oxygen containing gas are contacted with the catalyst at a pressure in the range of from 2 to 200 bar (absolute).

9. A process according to claim 1, wherein the stream comprising elemental sulphur and particulate oxidation catalyst discharged from the selective oxidation reaction zone comprises particulate oxidation catalyst in a concentration in the range of from 2 to 50 wt %, and comprises elemental sulphur in a concentration in the range of from 50 to 98 wt %.

10. A process according to claim 1, wherein the particulate oxidation catalyst is in the form of particles having an average diameter in the range of from 0.2 to 100 µm.

11. A process according to claim 1, wherein the temperature in step (c) is in the range of from 110 to 180° C.

12. Use of the stream comprising elemental sulphur and particulate oxidation catalyst that is obtained in a selective oxidation process as defined in step (a) of the process according to claim 1 to prepare a sulphur cement product.

13. A process according to claim 1, wherein in selective oxidation step (a) the hydrogen sulphide containing feed gas and the molecular-oxygen containing gas are contacted with the catalyst at a temperature in the range of from 110 to 180° C.

14. A process according to claim 1, wherein in selective oxidation step (a) the hydrogen sulphide containing feed gas and the molecular-oxygen containing gas are contacted with the catalyst at a temperature in the range of from 125 to 150° C.

15. A process according to claim 1, wherein in selective oxidation step (a) the hydrogen sulphide containing feed gas and the molecular-oxygen containing gas are contacted with the catalyst in the presence of elemental sulphur as inert liquid medium.

16. A process according to claim 1, wherein the particulate oxidation catalyst comprises an oxide and/or sulphide compound of iron.

17. A process according to claim 1, wherein the particulate oxidation catalyst comprises a hydrated oxide compound of iron.

18. A process according to claim 1, wherein the hydrogen sulphide containing feed gas comprises hydrogen sulphide in a concentration in the range of from 1 to 25 volume %.

19. A process according to claim 1, wherein in selective oxidation step (a) the hydrogen sulphide containing feed gas and the molecular-oxygen containing gas are contacted with the catalyst at a pressure in the range of from 10 to 150 bar (absolute).

20. A process according to claim 1, wherein the stream comprising elemental sulphur and particulate oxidation catalyst discharged from the selective oxidation reaction zone comprises particulate oxidation catalyst in a concentration in the range of from 5 to 35 wt %, and comprises elemental sulphur in a concentration in the range of from 65 to 95 wt %.

* * * * *